(No Model.)
M. R. MARTIN.
WINDMILL GEARING.
No. 429,931. Patented June 10, 1890.
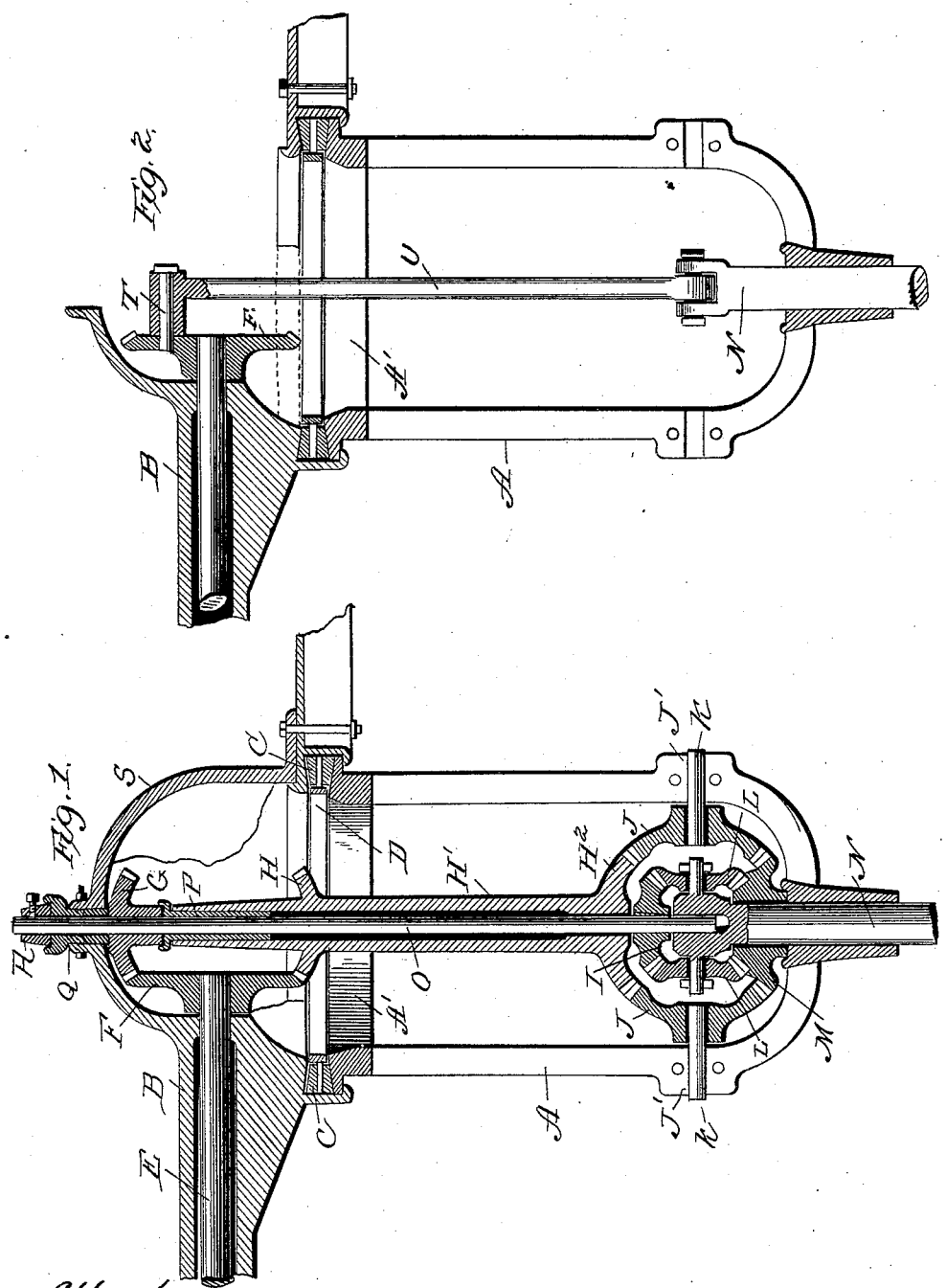

UNITED STATES PATENT OFFICE.

MYRON R. MARTIN, OF HUMBOLDT, IOWA.

WINDMILL-GEARING.

SPECIFICATION forming part of Letters Patent No. 429,931, dated June 10, 1890.

Application filed December 27, 1889. Serial No. 335,114. (No model.)

*To all whom it may concern:*

Be it known that I, MYRON R. MARTIN, of Humboldt, in the county of Humboldt and State of Iowa, have invented a new and useful Improvement in Windmill-Gearing; and I do hereby declare that the following is a full, clear, and exact description of the same.

My invention is an improved windmill-gearing designed to prevent the wheel from shifting out of the wind under the resistance of the work being done.

In the accompanying drawings, Figure 1 is a central vertical section through the tower and gearing. Fig. 2 is a similar view with the parts removed.

The tower-casting A is provided with a circular track, on which the turn-table B revolves, which is also provided with a similar circular track, between which the conical anti-friction rollers C revolve. These are made hollow to receive pivots on the circumference of the roller-ring D to keep the rollers the proper distance apart. The turn-table B thus has an easy movement on the tower-casting and is journaled to receive the wind-wheel shaft E, on which is secured the main driving-gear F, which engages with the gear G on its upper side, and on the lower side with a corresponding gear H, secured to or made a part of the sleeve H'. The lower end of said sleeve is provided with another gear $H^2$, which engages on opposite sides with the gears J J. These are mounted loosely upon their respective journals K, secured to the stationary tower-casting A. The gears J J in turn engage with the outer series of teeth on the double gear M, which is mounted loosely upon the shaft N, to be described hereinafter. The gear G, before spoken of, is fixed to the shaft O, which passes down through the sleeve H'. A removable bushing P is provided between the shaft O and sleeve H'. The shaft O is kept in place by means of a movable bearing Q, secured to the turn-table B. Above the bearing Q is a collar R, secured to the shaft O, with a set-screw to keep it from displacement. Below the sleeve H' is a gear I, keyed to the shaft O, which latter is kept in a central position by projecting into the upper end of the shaft N, before spoken of. Near the top of the shaft N are two arms projecting at right angles from the shaft and on opposite sides, on which the gears L L are loosely mounted and engage with the gear I on the upper side and the inner set of teeth on the double gear M on the under side, and are kept in place by means of the collar pinned on each arm of the shaft N. This shaft passes loosely down through the double gear M and the tower-casting, where it then connects with the vertical shaft in the tower. It is now evident that the sleeve H' revolves in the opposite direction to that in which gears G I and the shaft O revolve, as they are each driven from opposite sides of the driving-gear F, and the lower gear on the sleeve H' revolves the intermediate gears J J, and they in turn the double gear M in the opposite direction from which the sleeve H' revolves or the same direction as the gear I revolves. As the double gear M has an inner set of teeth which engages with the gear L L and their opposite sides engage with the gear I, they are caused to rotate and carry with them the vertical shaft N. They do not revolve on the arms of the shaft N unless the mill shifts with the wind. In that case the gears G and I revolve in the same direction as does the sleeve H', and the double gear M is then revolved through the intermediate gear J J in a direction opposite to that in which the gear I revolves. Then the gears L L revolve on the arms of the shaft N without turning the said shaft. Therefore the speed of the driven machinery is not affected by the shifting of the mill on the tower, and the mill has no inclination to run out of the direct line of the wind, as is the case in common geared windmills. This construction and gearing are such that the wearing-surfaces are separate from the main casting, and all or any of the gearing can be easily removed in case any of the bearings cut out from neglect of oiling and replaced with new ones without taking the mill down or removing the main castings from the tower by removing the shield S, which protects the gearing from rain, snow, and sleet. Disconnect the bearing Q from the turn-table B, then all the gearing and journals can be taken out through the roller-ring D and the turn-table B.

In Fig. 2 the tower-casting A and turn-table

B are shown with the balanced gearing removed and a crank-pin T placed in the gear F and provided with the pitman U and plunger N, now constructed as only a pumping-windmill which can be thus used, and any time thereafter the crank-pin T, the pitman U, and plunger N can be removed and replaced with the balanced gearing shown in Fig. 1 without the aid of an expert and be made into a complete geared wheel.

It will be observed that the main tower-casting is U-shaped and has its upper portion braced and connected simply by a ring A'. The interior of the casting is entirely free from obstruction. By reason of the peculiar form of connection between the shafts O and N the said shaft O and the sleeve H' are properly supported without necessitating any bearings or cross-bars extending across the space within the tower-casting. This leaves the interior free, as before stated, and when the shield and the upper bearing Q is removed the gearing may be readily removed. The shield s, with the bearing Q, thus constitutes a removable journal for the upper end of the gear-shaft O.

I claim as my invention—

1. In combination, the tower-casting, the swiveled head, the wind-wheel shaft E, the shafts O and H', geared to said shaft, the gears I and H² on said shafts O and H', respectively, the shaft N, and the balance-gearing between the shafts O and H', and the shaft N, for communicating power to the latter, consisting of the double gear M about the shaft N, the pinion L, carried by the shaft N, meshing with the gears M and I, and the gear J, journaled in the tower and meshing with the double gear M and the gear H², substantially as described.

2. In combination, the tower-casting, the swiveled head supported thereon, the wind-wheel shaft E, having the gear F, the shaft N at the lower end of the tower-casting, and removable vertical shafting and gearing between the gear F and the shaft N, the said swiveled head having a removable bearing for the shafting, and the interior of the tower-casting being free and open at the top to permit the removal of said shafting and gearing, substantially as described.

3. In combination, the tower-casting, the swiveled head, the windmill-shaft having a gear F, the shaft N, journaled at the lower end of the tower-casting, the train of mechanism for communicating movement thereto from the gear F, including the vertical shafting, the removable bearing Q for the vertical shafting, and the removable shield S on the swiveled head, substantially as described.

4. In combination, the tower-casting, the swiveled head, the shaft having a gear F, the bearing Q, attached to the said swiveled head, the shaft N in the tower-casting, the said shaft N having a bearing-socket at its upper end, the shaft O, journaled in the said bearing-socket of the shaft N, and the bearing Q, and the gearing between the shafts O and N, substantially as described.

5. In combination, the tower-casting formed with its interior space and upper end free from obstruction, the swiveled head carrying the windmill-shaft and gear-wheel F, the shaft N at the lower end of the tower-casting, and the removable vertical connection between said gear-wheel F and the shaft N, extending through said free interior space, whereby the mill may be changed from a pumping to a geared mill or the reverse, substantially as described.

6. In combination with the swiveled head, the U-shaped tower-casting having its interior and upper end free from obstruction and connected at its top by a ring A', and having a bearing at its lower end for a vertical shaft and bearing J' for gearing, substantially as described.

In testimony whereof I have signed my name to this specification in the presence of two subscribing witnesses.

MYRON R. MARTIN.

Witnesses:
L. D. HACK,
O. D. MARTIN.